(12) United States Patent
Hsiao

(10) Patent No.: US 7,065,827 B2
(45) Date of Patent: Jun. 27, 2006

(54) SHOCK ABSORBER STRUCTURE OF A CASTOR WHEEL

(76) Inventor: Te-Hsin Hsiao, P.O. Box 82-144, Taipei (TW)

(*) Notice: Subject to any disclaimer, the term of this patent is extended or adjusted under 35 U.S.C. 154(b) by 0 days.

(21) Appl. No.: 10/309,035

(22) Filed: Dec. 4, 2002

(65) Prior Publication Data

US 2004/0107534 A1 Jun. 10, 2004

(51) Int. Cl.
*B60B 33/00* (2006.01)
*A47B 91/00* (2006.01)

(52) U.S. Cl. .......................................... 16/44; 16/35 D
(58) Field of Classification Search ................ 16/44, 16/35 D, 19; 188/380; 267/178, 216; 248/188.2; 280/47.12, 47.15, 47.16, 47.22; 5/510
See application file for complete search history.

(56) References Cited

U.S. PATENT DOCUMENTS

| | | | | |
|---|---|---|---|---|
| 3,911,525 A | * | 10/1975 | Haussels | 16/35 R |
| 5,001,808 A | * | 3/1991 | Chung | 16/18 CG |
| 5,165,141 A | * | 11/1992 | Soltani | 16/44 |
| 5,303,450 A | * | 4/1994 | Lange | 16/35 D |
| 5,351,364 A | * | 10/1994 | Zun | 16/35 R |
| 5,875,519 A | * | 3/1999 | Chou | 16/46 |
| 6,195,838 B1 | * | 3/2001 | Mains et al. | 16/25 |

FOREIGN PATENT DOCUMENTS

JP             10000901 A    *   6/1998
JP       2001301405 A    *   10/2001

* cited by examiner

*Primary Examiner*—Chuck Y. Mah
(74) *Attorney, Agent, or Firm*—Leong C. Li

(57) ABSTRACT

A shock absorber structure of a castor wheel is disclosed. The bottom section of a leg is inserted with a mounting tube and the circumferential edge of the leg is mounted with a protective hood. A screw nut is used to lock the mounting tube and the protective hood to the bottom section of the leg. The interior of the protective hood and the mounting tube are inserted with an insertion shaft having a bottom section passed through between two bearings on the seat of the castor and a screw nut locks the seat at the bottom section of the through shaft such that the seat can be freely rotated with the through shaft as the shaft center. Further, the top and the bottom section of the through shaft are respectively mounted with a spring to form into top and bottom buffer. The buffer is effectively used as the shock produced as a result of uneven ground and allowing the castor wheel to pass an obstacle.

1 Claim, 3 Drawing Sheets

SHOCK ABSORBER STRUCTURE OF A CASTOR WHEEL

BACKGROUND OF THE INVENTION (a) Technical Field of the Invention

The present invention relates to shock absorber, and in particular, to shock absorber which employed in castor wheel, allowing the castor wheel to pass an obstacle smoothly.

(b) Description of the Prior Art

In order to facilitate the transportation of patients on a hospital bed, or of equipment on a platform with rollers, and moves in 360 degree, these rollers or castor wheels are mounted directly onto the bottom end of the support connected to the platform of the hospital bed. However, when the hospital bed or the castor wheels pass an obstacle or uneven ground, the shock that generated by the ground may hurt the patient, in particular, when the castor wheels pass through a hole found on the floor or ground. No shock absorbing device is provided to the castor wheels and therefore any shock will directly be transferred to the support then to the bed. Accordingly, it is an object of the present invention to provide a shock absorber structure of a castor wheel which will mitigate the above drawbacks.

SUMMARY OF THE INVENTION

Accordingly, it is an object of the present invention to provide a shock absorber structure of a castor wheel, the bottom section of a leg is inserted with a mounting tube and the circumferential edge of the leg is mounted with a protective hood. A screw nut is used to lock the mounting tube and the protective hood to the bottom section of the leg. The interior of the protective hood and the mounting tube are inserted with an insertion shaft having a bottom section passed through between two bearings on the seat of the castor and a screw nut locks the seat at the bottom section of the through shaft such that the seat can be freely rotated with the through shaft as the shaft center. Further, the top and the bottom section of the through shaft are respectively mounted with a spring to form into top and bottom buffer. The buffer is effectively used as the shock produced as a result of uneven ground and allowing the castor wheel to pass an obstacle.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
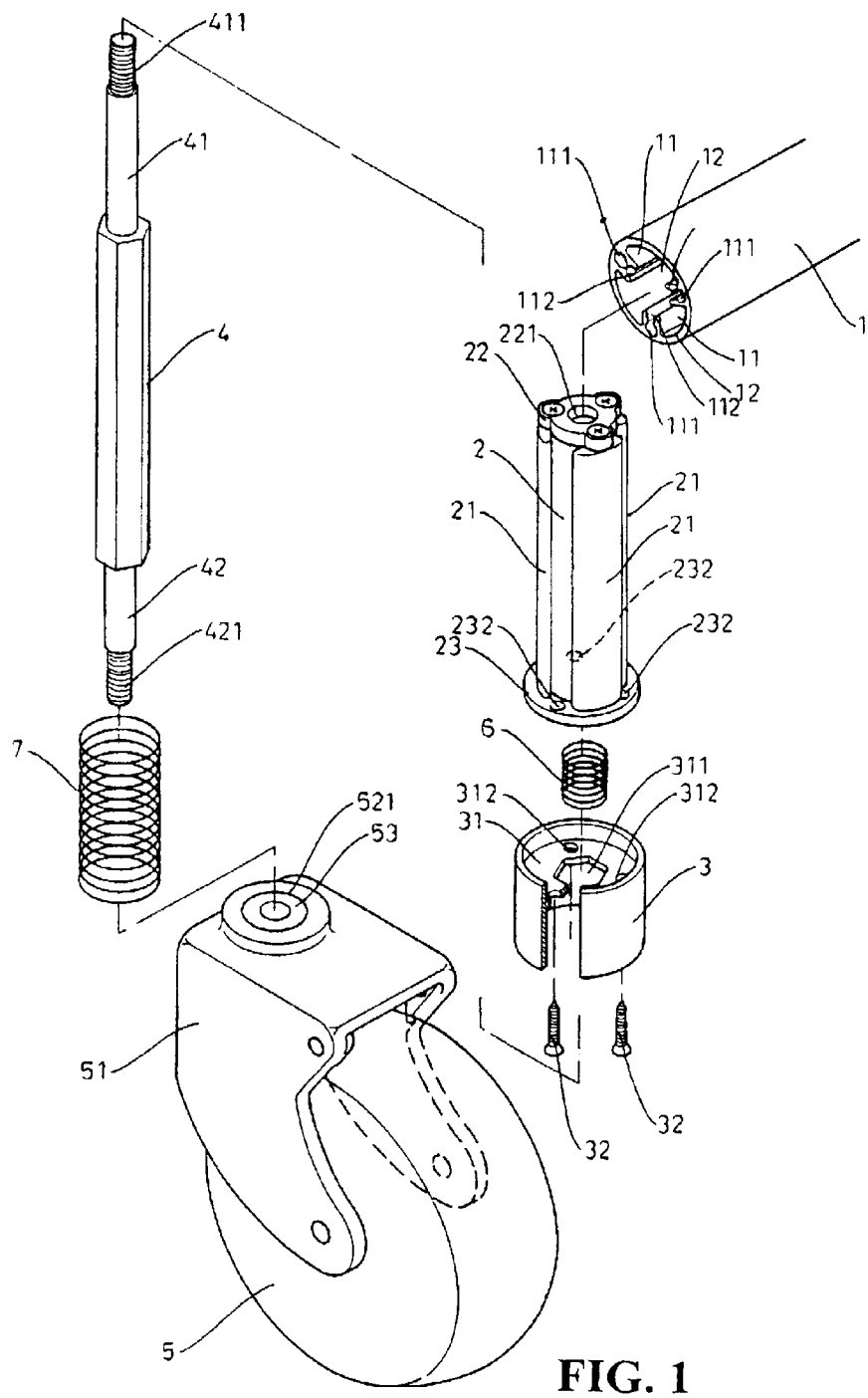
FIG. 1 is a perspective exploded view of a shock absorber structure of a castor wheel in accordance with the present invention.

Referring to FIG. 1, there is shown a shock absorber structure of a castor wheel having a leg 1, a mounting tube 2, a protective hood 3, an insertion shaft 4, a castor wheel 5 and a top and a bottom spring 6, 7.

Figure 2:
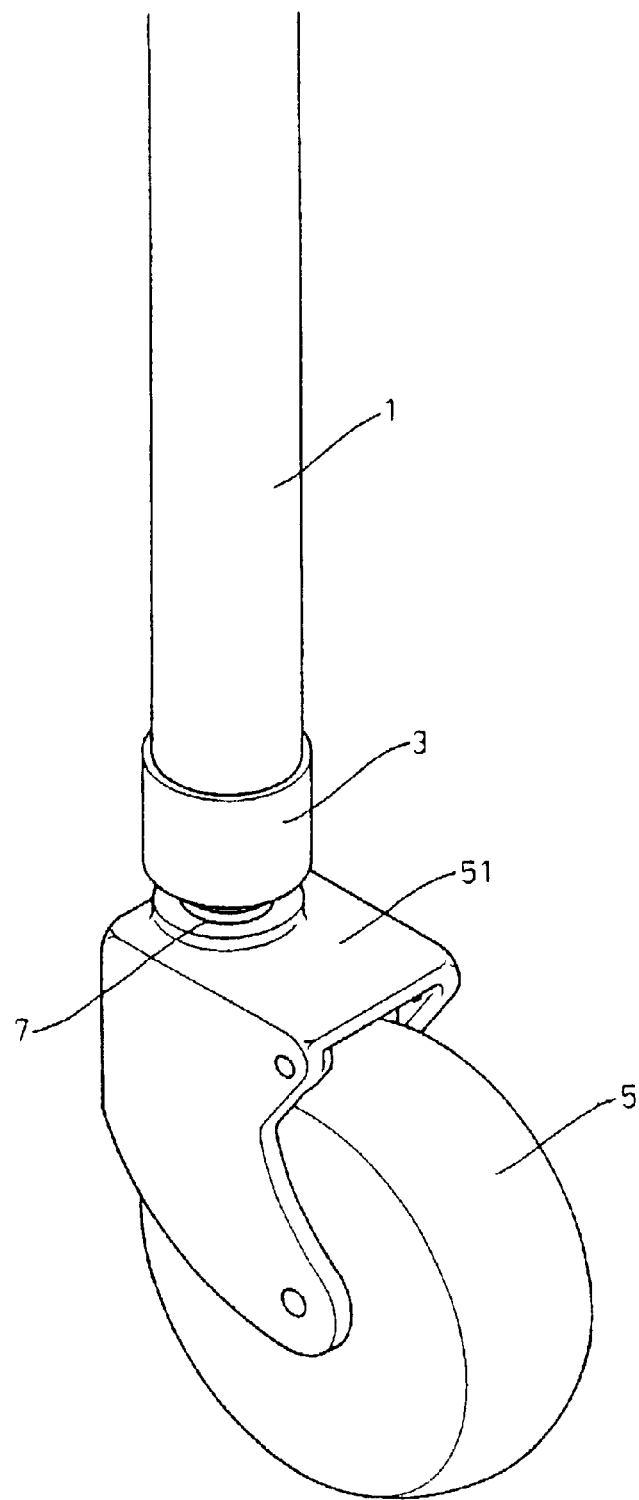
FIG. 2 is a perspective view of a shock absorber structure of a castor wheel in accordance with the present invention.
Figure 3:
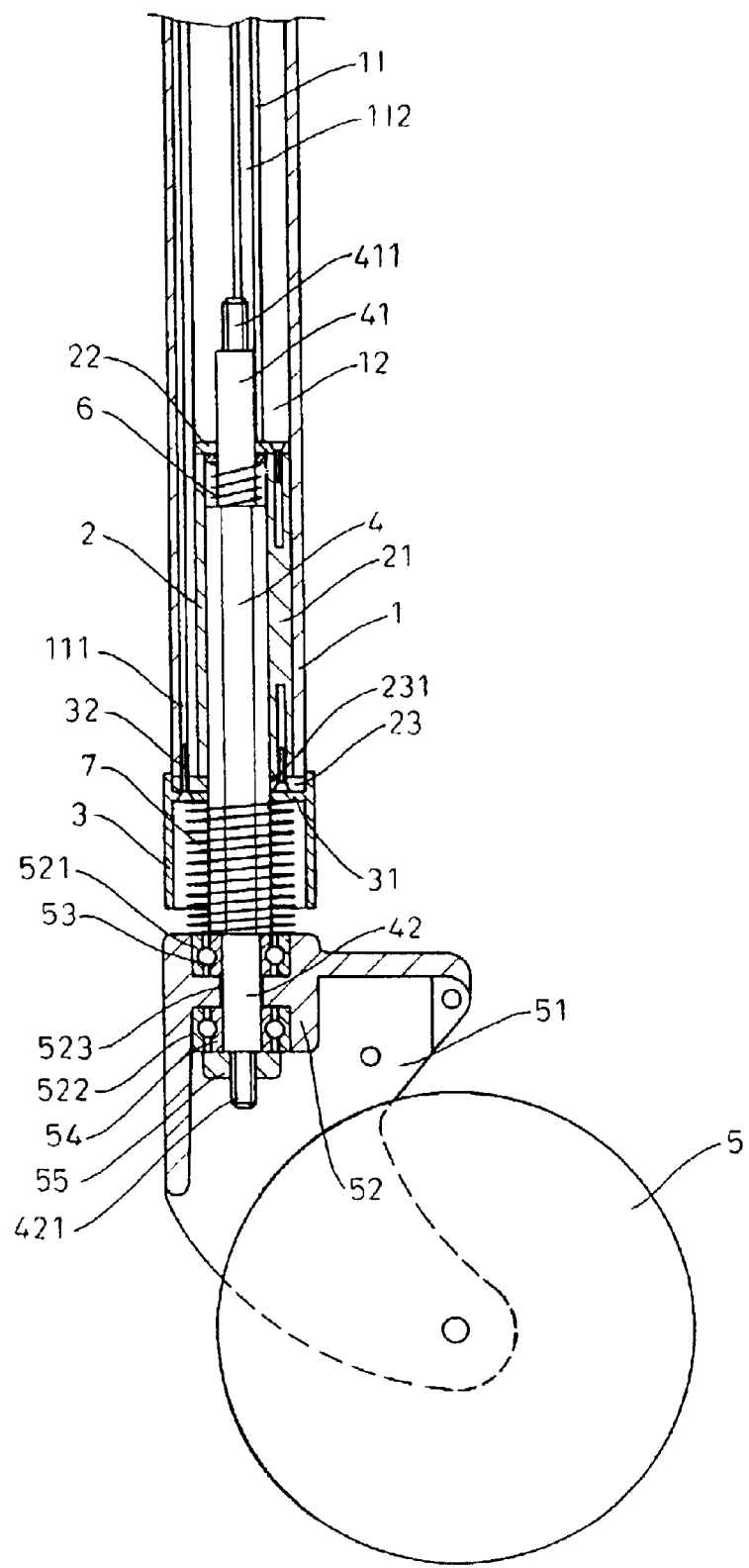
FIG. 3 is a sectional view of the shock absorber structure of a castor wheel in accordance with the present invention.

Referring to FIGS. 2 and 3, the leg 1 is a tubular tube having three protruded stripes 11 within the internal wall thereof, and divide into fan-like insertion slot 12 and a bolt hole 111 is formed on a protruded stripe 11, and the mounting tube 2 matches the inner wall of the leg 1 and has a hexagonal hole, and the external edge is provided with three fan-like filing blocks 21 for the mounting of the bottom section of the leg 1, and the top end thereof is locked with a cap 22 and the bottom end is screwed with a circular base seat 23, the center of the cap 22 is provided with a circular hole 221 and the bottom seat 23 urges the lower section of the leg 1, and the center of the bottom seat 23 is provided with a hexagonal hole for connection with the mounting tube 2, and the bottom seat 23 is provided with a securing hole 232; the protective hood 3 is mounted at the external edge of the leg 1 and the bottom seat 23, and the inner surface is provided with a horizontal partition board 31 having a through hole for the communication with the interior of the mounting tube 2, and the circumferential edge is provided with three groups of mounting holes 312; the shaft 4 is hexagonal and has a top and bottom portion extendingly mounted with circular supports 41, 42, the end edge of the circular supports 41, 42 is threaded; the castor wheel 5 is pivotally mounted to the lower section of the seat 51 having a protruded block 52, the top and the bottom section of the protruded block 52 is provided with a bearing seat 521, 522 mounted with bearings 53, 54, a circular insertion hole 523 is located between two bearing seats 521, 522, the springs have different diameter and are respectively mounted onto the top and bottom section of the shaft.

The circular support passes through the space between the two bearings 53, 54 such that the support comes out from the bottom edge of the bearings 53, 54 and a nut 55 is mounted from the bottom end of the threaded portion 421 and the seat 51 is mounted at the lower section of the shaft 4, and the top section of the shaft 4 is mounted from the bottom end of the protective hood 3 to pass through the through hole and the communication hole at the base seat 23, and via the circular hole at the cap 22 center, and the circular support is extended into the interior of the leg 1 and the springs 6, 7 are respectively urge the bottom face of the cap 22 and the top edge of the hexagonal shaft, and the bottom face of the protective hood 3 and the top edge of the protruded block 52, and screw nut 55 via the mounting hole, securing hole, the castor wheel is mounted to the bottom section of the leg 1, and the shock of the castor wheel is absorbed.

The top and bottom springs 6, 7 are formed of different coil diameter, and are respectively mounted onto the top and bottom section of the through shaft 4. The top and the bottom springs 6,7 are mounted within the interior of the mounting tube 2 and are pressed against the bottom face of the cap 22 and between the top edge of the hexagonal shaft of the through shaft 4 to resist the shock produced at the castor wheel at the through shaft 4. The top and bottom spring 7 is adapted between the protective hood for absorbing shock generated due to uneven ground, avoiding the shock being transferred to the leg 1.

In accordance with the present invention, when installation, an appropriate length of the leg 1 is cut for use in, for instance, hospital beds. The mounting tube 2 is mounted from the bottom end of the leg 1. The protective hood 3 and the bottom end of the leg 1 are mounted to each other. The protective hood 3 and the top spring 6 are mounted from the top end of the through shaft. The top end of the through shaft 4 is mounted from the bottom section of the mounting tube 2 and then adjust the combination hole 312 of the protective hood 3, and the securing hole 232 at the bottom seat 23 of the mounting tube 2, and the bolt hole 111 of the leg 1 so that these holes are in aligned with each other. After that screw nut 32 is used to mount therebetween for securing. Next, the bottom spring 7 and the castor wheel 5 are mounted, and finally, the top end of the leg 1 is secured at the cover section of the bed.

The hospital bed after mounted with the castor wheel in accordance with the present invention can withstand a maximum load of 200 kg for each wheel. Therefore, the bed can withstand a load of 8000 kg and when the bed passes a hump or an obstacle, the shock that generated by the uneven ground will pass through the top and bottom springs 6, 7 at the through shaft 4 and the shock will be absorbed and will not transfer to the leg 1, facilitating the smooth movement of the bed.

A mounting tube 2 is locked at the bottom section of the leg 1 for the top mounting of the through shaft 4, and by the upward displacement, the top section of the through shaft 4 passes through the bearings 53, 54 on the seat 51 such that the seat 51 can freely rotate about the through shaft as the shaft center.

By means of the cap 22 and the top and bottom springs 6, 7 the bed with the castor wheel will absorb the shock due to the uneven ground or obstacle. The shock absorber is effectively for absorbing the shock that generated.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A shock absorber of a caster wheel comprising:

a tubular leg, a mounting tube, a protective hood, a shaft, a top compression spring and a bottom compression spring, a caster seat, and a caster wheel;

said tubular leg having three protruding stripes within an internal wall thereof, said internal wall being divided into three fan-like insertion slots, a bolt hole being formed on each protruding stripe;

said mounting tube having an external peripheral edge configured with three fan-like filing blocks adapted to be inserted into said fan-like insertion slots of said leg, a top end of said mounting tube having a cap attached thereto and a bottom end being screwed with a circular base seat, the center of said cap provided with a circular hole and the base seat provided with a hexagonal hole, said base seat having three securing holes corresponding to the bolt holes of said protruding stripes;

said protective hood having an inner surface and provided therein a horizontal partition board having a hexagonal through hole in communication with the Interior of the mounting tube, said partition board further having three mounting holes corresponding to the bolt holes and the securing holes;

said shaft having a hexagonal middle portion, a circular top end portion, and a circular bottom end portion, free ends of said top and bottom portions being threaded;

said caster seat having said caster wheel mounted to a lower portion thereof, an upper portion having a bearing seat with an insertion hole receiving two bearings, and wherein said tubular leg, said mounting tube and said protective hood are mounted together by screws through said bolt holes, securing holes and mounting holes; said shaft extends through said hexagonal hole of said protective hood and said hexagonal hole of said base seat; said top end portion of the shaft protrudes through the circular hole of said cap and said bottom end of the shaft portion protrudes through the insertion hole of the bearing seat and the bearings; a nut is mounted on the threaded end of the bottom end; said top compression spring is mounted on the top end portion of the shaft between the cap and the middle portion, and the bottom compression spring is mounted on a bottom portion of the middle portion of the shaft between the bearing and the protective hood.

* * * * *